March 24, 1964  A. D. SUTTLE, JR., ETAL  3,126,322
CONSERVATION OF THERMAL ENERGY
Original Filed April 26, 1957

INVENTORS.
Hermann E. von Rosenberg,
Andrew D. Suttle, Jr.,
BY Frank S. Troidl
ATTORNEY.

3,126,322
CONSERVATION OF THERMAL ENERGY
Andrew D. Suttle, Jr., Jackson, Miss., and Hermann E. von Rosenberg, Baytown, Tex., assignors, by mesne assignments, to Esso Research and Engineering Company, Elizabeth, N.J., a corporation of Delaware
Continuation of application Ser. No. 655,404, Apr. 26, 1957. This application July 14, 1960, Ser. No. 42,849
2 Claims. (Cl. 176—51)

This invention relates to the conservation of the thermal energy derived from nuclear reactions. More particularly, the present invention is directed to an improved coolant for a nuclear reactor for use in the conservation of thermal energy derived from nuclear reactions.

This is a continuation of our copending application Serial No. 655,404, now abandoned, filed April 26, 1957, entitled "Conservation of Thermal Energy."

A substantial portion of the energy generated in a nuclear reactor is thermal energy. It is desirable to conserve such thermal energy. This is accomplished in accordance with the present invention by providing a stream of a flowing organic liquid (as hereinafter defined) for cooling the nuclear reactor or for both cooling the reactor and moderating the nuclear reaction. The thermal energy imparted to the coolant may then be utilized exterior to the nuclear reactor in any desired manner such as, for example, to provide a heating medium for power generation, distillation, chemical conversion, etc.

The coolant of the present invention is a hydrocarbon fraction boiling within the range of about 220° C. and 650° C. at atmospheric pressure, such mixture having a boiling range of at least 50° C., having a melting point (i.e., a pour point) of less than about 45° C. and containing not more than about 5 weight percent of extraneous materials having neutron cross-sections of more than about 10 barns. The coolant preferably boils in the range between about 340° and 550° C. Preferred sources of the coolant materials for the present invention are petroleum hydrocarbon fractions boiling in the gas oil range and higher. Such fractions may include low sulfur content virgin gas oil fractions, desulfurized gas oil fractions of crude oils, gas oil boiling range cycle stocks obtainable by the catalytic cracking of petroleum hydrocarbons, aromatic extracts of such catalytic cycle stocks, heating oil boiling range fractions, etc.

In accordance with the present invention, a coolant of the class described above is flowed through a nuclear reactor containing a critical mass, such as uranium-235, uranium enriched with U–235, uranium enriched with Pu–239, a mixture of U–233 with thorium, etc. The amount of coolant employed and the rate of flow of such coolant through the nuclear reactor are adjusted to provide for control of the temperature of the reactor and control of the extent of radiation and heating to which the coolant is to be subjected.

The coolant should be exposed to a total radiation dosage of not more than about $10^{10}$ rads. The total radiation dosage may vary over a wide range, but for efficiency of operation is preferably within the range of about $10^7$ to $10^8$ rads (1 rad=100 ergs/gm.).

The principal contaminant of the petroleum hydrocarbon fractions of the present invention is sulfur, which is present principally in the form of organic sulfur compounds. Sulfur content will normally be within the range of about 0.1 to 5 weight percent. Asphaltenes may be present to at least a minor extent in coolants of the present invention which contain components boiling above 480° C. and such alphaltenes may have associated therewith metallo-organic compounds such as porphyrins, etc. The metal components of metallo-organic materials are principally nickel, vanadium and iron, such metals having comparatively small neutron cross-sections, comparatively short half lives and being present in amounts aggregating not more than about 10 to 100 parts per million, based on the total volume of coolant.

The extent to which impurities such as sulfur, porphyrins, etc. may be present will vary within comparatively wide limits. Thus, for a total radiation dosage of about $10^{10}$ rads, a sulfur content of 1% is not objectionable. For smaller radiation dosages, larger amounts of sulfur are not objectionable. Radioactive sulfur has a comparatively short half life of 87 days and emits soft beta radiation in the order of about 0.167 mev. Therefore, the presence of small amounts of sulfur-containing contaminants is not objectionable.

The coolant should be flowed through the nuclear reactor under conditions such that not more than about 5% of the coolant is converted.

In general, the upper temperature limit for the coolant will be determined by the susceptibility of the coolant to thermal decomposition. With reference to thermal conversion, it is to be observed that the extent of thermal conversion is dependent on time as well as temperature. The coolant should not be heated above the temperature of incipient thermal decomposition for periods of time sufficient to permit more than a minor amount (e.g., 5 volume percent) of thermal conversion. Therefore, as a general rule, the coolant will be heated to a maximum temperature within the rage onf about 400° to about 650° C. for a maximum time within the range of about 1 to 20 minutes. As a specific example, a virgin gas oil fraction boiling within the range of about 340° to 550° C. and containing from about 5 to 20 volume percent of aromatics may be heated to a maximum temperature of about 375° C. provided that such fraction is maintained at this temperature for not more than about 3 minutes. For a heating time of 10 minutes the maximum temperature should not exceed about 350° C. A gas oil boiling range catalytic cycle stock fraction boiling within the range of about 340° to 550° C. and containing from about 30 to 80 volume percent of aromatics may be heated to a maximum temperature of about 430° C. for a maximum heating time at such temperature of not more than about 3 minutes. With this coolant it is preferable to avoid the use of temperatures of more than about 400° C. when the heating time exceeds about 10 minutes. An aromatic extract fraction of catalytic cycle stock boiling within the range of about 340° to about 550° C. obtained by the solvent extraction of a catalytic cycle stock with a solvent such as phenol, furfural, nitrobenzene, sulfur dioxide, etc. and consisting essentially of aromatic compounds may be heated to a temperature of about 600° C. for a total heating time of about 3 minutes or less to a maximum temperature of about 450° C. for a heating time of about 5 minutes.

The pressure to be imposed on the coolant at the point of introduction of the coolant into the nuclear reactor should be at least sufficient to provide for a rate of coolant flow sufficient to prevent excess heating and/or excess irradiation of the coolant. Normally, a pressure of about 50 p.s.i.g. or less will be sufficient. Pressures of up to about 200 p.s.i.g. may be employed with satisfactory results and, if desired, still higher pressures may be employed.

As a consequence of the present invention, numerous advantages are obtained. Thus, it is possible to operate nuclear reactors cooled with organic coolants at temperatures which are substantially higher than those now considered practical in nuclear technology. The coolants are substantially non-corrosive in nature and, as a consequence, corrosion does not present a serious problem. Also, excessively high pressures are not required whereby the nuclear reactor may be of lighter and simpler construction. Furthermore, and as stated above, exposure of the coolant to nuclear radiation within the nuclear reactor does not render the coolant radioactive to more than a slight extent so that the use of shielding for the coolant exterior to the nuclear reactor is not necessary. Still further, there is only a minimum impairment of neutron efficiency.

In accordance with one form of the present invention the coolant is flowed through the nuclear reactor in the described manner and the thermal energy imparted to the coolant in flowing through the nuclear reactor is utilized by bringing the coolant into countercurrent indirect heat exchange contact with a power generating medium such as water or water vapor in order to generate steam. The steam may then be passed through a suitable power generating means such as a steam turbine to generate electrical energy.

In accordance with another form of the present invention, the thermal energy imparted to the coolant is utilized exterior to the nuclear reactor for converting the coolant into more valuable hydrocarbons. Thus, for example, if the coolant is a virgin gas oil fraction, a catalytic cycle stock fraction, or a mixture of such fractions, the coolant may be passed directly from the nuclear reactor to a catalytic cracking zone where the coolant may be catalytically cracked in contact with a suitable cracking catalyst such as a silica-alumina cracking catalyst under catalytic cracking conditions. The products of the catalytic cracking reaction may be fractionated to provide a wide variety of valuable hydrocarbons including high octane gasoline components, normally gaseous alpha-olefins, etc.

In accordance with a further embodiment of the present invention, the thermal energy imparted to the coolant in the nuclear reactor may be utilized to heat another petroleum hydrocarbon to be converted. For example, the coolant may be brought into countercurrent indirect heat exchange contact with a straight run naphtha fraction to heat the naphtha fraction to a reforming temperature and the thus heated naphtha fraction may then be reformed in contact with a reforming catalyst such as platinum on alumina, molybdena on alumina, etc.

It will be understood, of course, that the foregoing are but exemplary of the many uses to which the thermal energy may be put. It will be further understood that the thermal energy may be simultaneously utilized for a plurality of such purposes.

The coolant may be flowed through the nuclear reactor in any desired manner. For instance, a single coolant may be utilized which may be introduced into the nuclear reactor at one or at a plurality of points and, similarly, removed from the nuclear reactor at one or a plurality of points. When a plurality of introduction points are utilized, a plurality of streams of coolants of different composition may be introduced and may be comingled within the reactor or may be flowed through the reactor in a separated condition in a plurality of flow paths. Where a plurality of streams of coolant are flowed through the nuclear reactor in a plurality of flow paths, the flow paths may be cocurrent or countercurrent. The plural flow paths may be arranged to provide for uniform heating of the separate streams or for different degrees of heating. For example, a gas oil extract fraction derived from the solvent extraction of a catalytic cycle stock gas oil fraction may be flowed through the core of a clear reactor and a second stream of a mixture of a catalytic cycle stock gas oil fraction with a virgin gas oil fraction may be flowed through the nuclear reactor in heat exchange relationship countercurrently to and annularly of the flowing stream of extract whereby the thermal energy derived from the nuclear reaction will be primarily imparted to the extract stream and whereby the extract stream will secondarily impart such thermal energy to the second stream by heat exchange contact. As a consequence, the extract stream may be heated to a temperature different from and above the temperature of the second stream of cycle stock and virgin gas oil. In this situation, the mixture of cycle stock with virgin gas oil may also be used to moderate the nuclear reactor.

The invention will be further illustrated by the accompanying drawings wherein.

Figures 1, 2, 3:
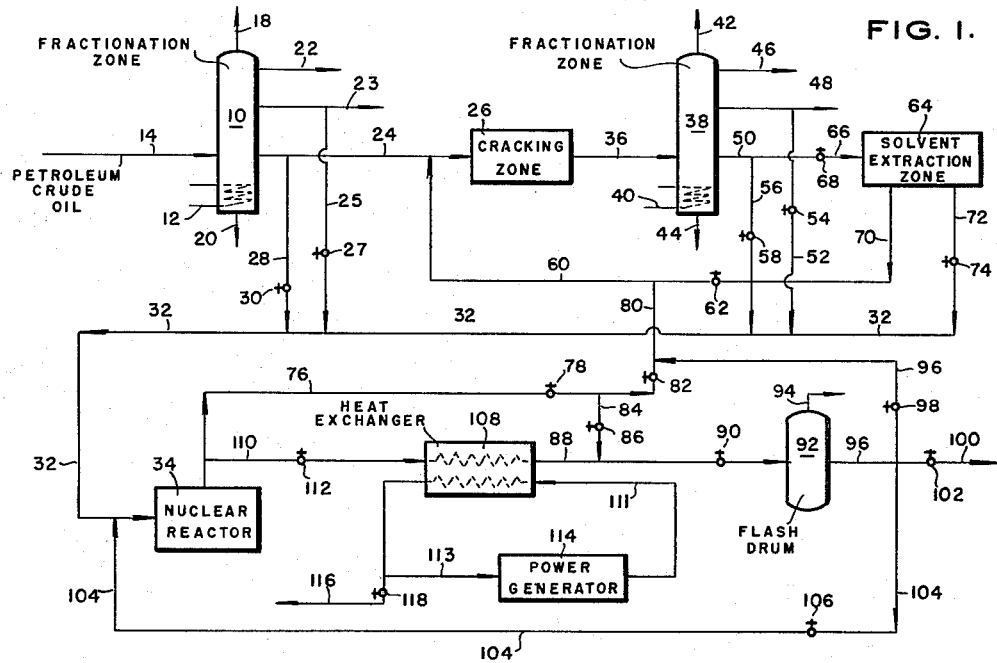
FIG. 1 is a schematic flow sheet illustrating a preferred embodiment of the present invention.
FIG. 2 is a schematic view in elevation of a nuclear reactor illustrating one manner in which the coolant may be flowed therethrough.
FIG. 3 is a schematic view in elevation of a nuclear reactor constructed to provide for a different flow pattern of coolant.

Turning now to FIG. 1, there is schematically shown a plurality of manners in which the coolant of the present invention may be obtained and employed. Thus, a petroleum hydrocarbon crude oil may be charged to a fractionation zone 10 provided with heating means such as a steam coil 12 by way of a charge line 14. The petroleum crude oil may be a low sulfur content petroleum crude oil or a desulfurized crude oil.

Within the fractionation zone 10 the crude oil is separated into a plurality of fractions such as an overheads fraction 18 and a plurality of distillate fractions including, for example, a naphtha fraction 22, a heating oil fraction 23 and a gas oil fraction 24. The heating oil fraction 23 may be introduced into a charge line 32 leading to a nuclear reactor 34 by way of a branch line 25 controlled by a valve 27. Similarly, the gas oil fraction 24 may be introduced into the charge line 32 by way of a branch line 28 controlled by a valve 30.

The gas oil fraction 24 may be charged to a cracking zone (thermal or catalytic) by way of the line 24. If desired, the gas oil fraction may be desulfurized, deasphalted, or both, in suitable units (not shown) prior to introduction into the cracking zone 26. Preferably, the cracking zone 26 is a catalytic cracking zone wherein the gas oil fraction is subjected to catalytic cracking conditions in the presence of a suitable cracking catalyst such as silica alumina. The products from the catalytic cracking zone 26 are discharged therefrom by way of a discharge line 36 leading to a fractionation zone 38 of any suitable construction provided with suitable heating means such as, for example, steam coil 40. Within the fractionation zone 38 the cracked products are separated into a plurality of fractions including an overheads fraction 42, a bottoms fraction 44, a light distillate fraction 46 such as a naphtha fraction, a middle distillate fraction 48 such as a heating oil fraction, and a heavy distillate fraction 50 such as a cycle stock fraction boiling in the gas oil boiling range. The heating oil fraction 48 may, if desired, be utilized as a coolant in accordance with the present invention and may be introduced into the charge line 32 for the nuclear reactor 34 by way of a branch line 52 controlled by a valve 54 when the heating oil is to be used for this purpose.

As indicated previously, the gas oil fraction 50 may be employed as a coolant and when the cycle stock fraction 50 is to be utilized as a coolant this may be accomplished by introducing the fraction 50 into the charge line 32 by way of a branch line 56 controlled by a valve 58. Alternately, all or a portion of the cycle stock may be returned to the cracking zone 26 by way of a recycle line 60 controlled by a valve 62.

As another alternative, the cycle stock fraction 50 may be charged to a solvent extraction zone 64 by way of a charge line 66 controlled by a valve 68 and there treated with a suitable solvent such as phenol, sulfur dioxide, furfural, etc., to obtain a raffinate stream 70 which is charged to the recycle line 60 and substantially wholly aromatic extract fraction which may be charged to the line 32 by way of a discharge line 72 controlled by a valve 74.

Coolant introduced into the charge line 32 from one or a plurality of the indicated sources is flowed through the nuclear reactor 34 as a cooling medium. The coolant is flowed through the nuclear reactor at a rate such that excessive heating and excessive radiation are avoided.

Heated coolant is discharged from the nuclear reactor 34 by a discharge line 76 controlled by a valve 78 for utilization in any desired manner. For example, the heated coolant may be returned directly to a suitable refinery processing unit such as the cracking zone 26. When this is to be done, the heated material is charged by way of the line 76 to a branch line 80 controlled by a valve 82 leading to the cracking zone recycle line 60.

In situations where a minor conversion of the coolant has occurred within the nuclear reactor 34, it may be desirable to remove gaseous material and when this is to be done the heated material is passed by way of a branch line 84 controlled by a valve 86 to a line 88 controlled by a valve 90 leading to a suitable separation zone such as a flash drum 92. Within the flash drum 92 pressure is reduced to an extent sufficient to permit low boiling conversion products to be removed by way of a line 94. The remainder of the material may then be passed to the return line 80 by way of a discharge line 96 controlled by a valve 98. If desired, all or a portion of the material may be discharged from the system by way of a line 100 controlled by a valve 102.

In situations wherein the coolant, after passage through the nuclear reactor 34, contains unhazardous amounts of radioactive materials, recycling may be desirable. When it is desired to recycle all or a portion of the coolant, this may be done by recycling the material to the charge line 32 by way of a recycle line 104 controlled by a valve 106.

In accordance with a preferred form of the present invention, the coolant, after passage through the nuclear reactor 34, is charged to a heat exchange means 108 of any suitable construction by way of a charge line 110 controlled by a valve 112. Within the heat exchange means 108 the coolant is brought into indirect countercurrent heat exchange contact with a suitable medium to be heated such as, for example, wet stream which is charged to the heat exchange means 108 by a line 111. The steam may be heated within the exchange means 108 and then discharged therefrom by way of a line 113 leading to a suitable power generating means 114 such as a turbine for generating electrical energy. Alternately, a portion of the steam may be withdrawn by way of a branch line 116 controlled by a valve 118 for use as a heating medium. Thus, for example, steam withdrawn by way of the line 118 may be introduced into the steam coils 12 and 40 of fractionation zones 10 and 38.

As specific examples of the practice of the present invention, petroleum fractions having the characteristics set forth in Table I may be employed as coolants.

Table I

| Property | Catalytic Cycle Stock | Atomatic Extract of Catalytic Cycle Stock | Virgin Gas Oil |
|---|---|---|---|
| Gravity, °API | 21.2 | 0.2 | 24.3 |
| Viscosity, SSU at: | | | |
| 100° F | 95.5 | 423 | 390 |
| 130° F | 59.3 | 143 | 171 |
| 210° F | 38.3 | 44 | 54 |
| Conradson Carbon, Wt. Percent | 0.04 | 1.70 | .046 |
| Pour Point, ° F | 90 | | 90 |
| Analine Point, ° F | 170 | 72 | 198 |
| Av. Boiling Point, ° F | 750 | 745 | 860 |
| ASTM Distillation, ° F: | | | |
| 10% off at | 695 | 681 | 712 |
| 50% off at | 752 | 736 | 846 |
| 90% off at | 824 | 827 | 1,030 |
| Composition: Wt. Percent: | | | |
| Paraffins | 19.4 | 3.0 | 10.9 |
| Noncondensed Naphthenes | 12.3 | 2.6 | 16.1 |
| Condensed Naphthenes | 24.4 | 5.7 | 35.3 |
| Aromatics | 37.1 | 73.0 | 31.2 |
| Aromatic Sulfur Compounds | 5.8 | 11.7 | 6.5 |
| Nonhydrocarbon Fraction | 1.0 | 4.0 | 0 |
| Elementary Analysis, by Weight: | | | |
| Nitrogen | 1.06% | 2.41% | 47 p.p.m. |
| Sulfur | Nil | Nil | 0.28% |
| Silicon | Nil | Nil | 0.4 p.p.m. |
| Sodium | Nil | Nil | 2.6 p.p.m. |
| Magnesium | Nil | Nil | >0.1 p.p.m. |
| Calcium | Nil | Nil | 3.9 p.p.m. |
| Aluminum | Nil | Nil | >0.3 p.p.m. |
| Vanadium | Nil | Nil | >0.3 p.p.m. |
| Chromium | Nil | Nil | >0.3 p.p.m. |
| Iron | Nil | Nil | 3.5 p.p.m. |
| Nickel | Nil | Nil | >0.4 p.p.m. |

In a situation wherein a nuclear reactor is provided with a core comprising U–235, Pu–239, U–233, a suitable mixture thereof, enriched uranium, etc., containing fissionable isotopes in quantities sufficient to reach criticality, such core being sufficient to provide about 100 thermal megawatts, the following procedures may be utilized. The virgin gas oil coolant of Table I may be introduced into the reactor at an inlet temperature of 100° C. and passed through the nuclear reactor at a flow rate of 40 to 50 gallons per second to provide an outlet temperature of about 350° C. After passage through the reactor, the coolant will contain from about $10^{-1}$ to about $10^{-4}$ microcuries per gram of radioactive sulfur and about $10^{-6}$ to $10^{-10}$ microcuries per gram of radioactive metals. The catalytic cycle stock of Table I may be introduced at a temperature of 100° C. and flowed through the reactor at the rate of about 35 to 40 gallons per second to provide for an exit temperature of 400° C. The extract of catalytic cycle stock may be introduced at 100° C. and caused to flow through the reactor at the rate of about 30 to 35 gallons per second to provide an exit temperature of about 450° C. The catalytic cyclestock and the aromatic extract thereof will contain from $10^{-1}$ to $10^{-4}$ microcuries of radioactive sulfur per gram.

In FIG. 2 there is disclosed a preferred manner of providing for moderation and cooling of a nuclear reactor in accordance with the present invention.

In accordance with this showing, there is provided a suitable core comprising, for example, a honeycomb of a radioactive material such as U–235, U–233, Pu–239, and fertile isotopes containing enough fissile material to be critical, the radioactive material in this instance being formed into thin sheets 200 secured together in the form of a honeycomb by means of an upper end plate 202 and a lower end plate 204, the end plates being provided with a plurality of openings 208 for the flow of coolant through the honeycomb. Suitable means such as columns 210 and 212 are provided for maintaining the core in a desired position. Suitable shielding means such as a high density concrete shield 214 is also provided. Radiation control means such as nickel boron control rods, safety rods, shim rods, etc., as schematically indicated by the rod 215, are provided for controlling the flux.

The core is surrounded by a first shell 216 provided with a plurality of openings 218 in the bottom thereof for the introduction of moderating material and with an outlet 220 for the withdrawal of moderating material. The inner shell 216 is surrounded by an outer shell 222, the outer shell 222 being provided with one or, preferably, a plurality of inlets 224 for the introduction of moderating material into the core. The top of the inner shell 216 may be insulated from the shell 218 by a suitable insulating means (not shown). In accordance with this construction, moderating material entering the core by way of the line 224 fills the space between the outer shell 222 and the inner shell 216 to provide a reflection zone for reflecting neutrons back into the core of the reactor. The moderating material flows generally downwardly through the space between the shells 216 and 222 and enters the core area by way of perforations 218 in the bottom of the inner shell 216. Within the inner shell 216 the moderating material flows generally forwardly and about the core plates 200. As a consequence of the use of the moderating material as a reflector and as a moderator such material is heated within the core and the heated material is discharged therefrom by way of the line 220.

In FIG. 3 there is shown another manner in which a nuclear reactor may be cooled and moderated in accordance with the present invention. In FIG. 3 there is schematically shown the nuclear reactor comprising a shield 300 encasing an outer shell 302, an inner shell 304 and a core 306 comprising a critical mass of radioactive material. Suitable means such as a rod 308 is provided for controlling the flux within the core 306. The inner shell 304 is provided with an inlet line 310 and an outlet line 312 while the outer shell 302 is provided with an inlet line 314 and an outlet line 316. In accordance with this embodiment of the present invention, a refractory coolant such as a low sulfur content extract of catalytic cycle stock is introduced into the inner shell 304 by way of the charge line 310 and flowed through and about the core 306 to cool the core. The heated extract fraction is withdrawn from the inner shell 304 by way of the discharge line 312. Simultaneously, a stream of a different cooling material such as a mixture of a virgin gas oil with cycle stock is introduced into the outer shell 302 by way of the charge line 314 and flowed counter-current and annular to the extract and is then withdrawn by way of a suitable discharge line 316. With this embodiment of the present invention, the extract stream is heated to a temperature of substantially above the temperature of the mixture introduced by way of the line 314. Thus, for example, the extract stream may be heated to a temperature of about 500° C. by suitable adjustment of flow rate whereas by adjustment of flow rate the mixture introduced by way of the line 314 may be heated by flow control to a temperature of about 350° C. In this situation the mixture of virgin gas oil and cycle stock introduced by way of the line 314 will serve as a moderator and receive only a minimized radiation dosage. In this situation, therefore, recycle of the material introduced by way of the line 314 may be highly desirable.

As another alternative, the coolant introduced into the inner shell 304 by the line 310 may be the same as the coolant introduced into the outer shell 302 by the line 314. Thus, for example, the coolant may be introduced into the inner shell 304 by the line 310, heated therein and discharged by way of the line 312. The heated coolant may be passed through a first heat exchange means (not shown), charged to the outer shell 302 by the line 314, withdrawn from the outer shell 312 by the line 316 after being heated in the outer shell 302 and then passed to a second heat exchange means (not shown). In this situation, the coolant will be subjected to a substantially reduced amount of radiation while passing through the outer shell 302.

What is claimed is:

1. In the operation of a shielded nuclear reactor of the hydrocarbon coolant type containing a core of a critical amount of fissionable nuclear material in a core zone, the improved method of operation to maintain the core zone at a desired temperature and to utilize the thermal energy generated in the core zone which comprises the steps of circulating a first fluent hydrocarbon coolant through said core zone, simultaneously circulating a second fluent hydrocarbon coolant through a moderating zone annular to the core zone in indirect countercurrent heat exchange contact with the first fluent hydrocarbon coolant in said core zone and flowing said fluent hydrocarbon coolants through an unshielded heat utilization zone exterior of said shielded nuclear reactor and extracting heat from said fluent hydrocarbon coolants in said heat utilization zone, said first fluent hydrocarbon coolant being a low sulfur content extract of catalytic cycle stock, said second fluent hydrocarbon coolant being a mixture of virgin gas oil with catalytic cycle stock, said fluent hydrocarbon coolant being flowed through said nuclear reactor at a flow rate sufficient to maintain said core zone at a desired temperature and to prevent thermal conversion of more than about 5 percent of said fluent hydrocarbon coolant, said fluent hydrocarbon coolants boiling within the range of about 220° to 650° C. and comprising a mixture of hydrocarbons, said fluent hydrocarbon coolants containing not more than about 5 volume percent of extraneous materials having neutron cross-sections of more than about 10 barns, said fluent hydrocarbon coolants being exposed to a total radiation dosage within the range of about $10^7$ to about $10^{10}$ rads.

2. In the operation of a shielded nuclear reactor of the hydrocarbon coolant type containing a core of a critical amount of fissionable nuclear material in a core zone, the improved method of operation to maintain the core zone at a desired temperature and to utilize the thermal energy generated in the core zone which comprises the steps of circulating a fluent hydrocarbon coolant through said core zone and then to a first heat exchange zone exterior of said shielding, then flowing said fluent hydrocarbon coolant from said first heat exchange zone through a moderating zone in said shielding annular to said core in a flow path providing indirect countercurrent heat exchange contact with the fluent hydrocarbon coolant in said core zone and thereafter flowing said fluent hydrocarbon coolant from said moderating zone to a second heat exchange zone exterior of said shielding, said fluent hydrocarbon coolant being flowed through said nuclear reactor at a flow sufficient to maintain said core zone at a desired temperature and to prevent thermal conversion of more than about 5 percent of said fluent hydrocarbon coolant, said fluent hydrocarbon coolant boiling within the range of about 220° to 650° C. and comprising a mixture of hydrocarbons, said fluent hydrocarbon coolant containing not more than about 5 volume percent of extraneous materials having neutron cross-sections or more than about 10 barns, said fluent hydrocarbon coolant being exposed to a total radiation dosage within the range of about $10^7$ to about $10^{10}$ rads.

References Cited in the file of this patent

UNITED STATES PATENTS

| 2,770,591 | Wigner et al. | Nov. 3, 1956 |
| 2,811,487 | Stanton | Oct. 24, 1957 |
| 2,816,068 | Ruano | Dec. 10, 1957 |
| 2,982,710 | Leyse | May 2, 1961 |
| 3,036,965 | Braün | May 29, 1962 |
| 3,041,261 | Kosmin et al. | June 26, 1962 |

FOREIGN PATENTS

| 697,601 | Great Britain | Sept. 23, 1953 |
| 708,901 | Great Britain | May 12, 1954 |